(12) United States Patent  (10) Patent No.: US 10,895,970 B2
Faulkner  (45) Date of Patent: Jan. 19, 2021

(54) DISPLAY CONTROL TO IMPLEMENT A CONTROL BAR

(71) Applicant: Microsoft Technology Licensing, LLC, Redmond, WA (US)

(72) Inventor: Jason Thomas Faulkner, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 16/007,479

(22) Filed: Jun. 13, 2018

(65) Prior Publication Data

US 2019/0384485 A1  Dec. 19, 2019

(51) Int. Cl.
*G06F 3/0484* (2013.01)
*G06F 3/0482* (2013.01)
(Continued)

(52) U.S. Cl.
CPC ........ *G06F 3/04845* (2013.01); *G06F 3/0482* (2013.01); *G06F 3/04817* (2013.01); *H04L 41/22* (2013.01)

(58) Field of Classification Search
CPC .. G06F 3/0482; G06F 3/04817; G06F 3/0481; G06F 9/451; G06F 2203/04803;
(Continued)

(56) References Cited

U.S. PATENT DOCUMENTS 9,148,627 B2  9/2015  Anderson et al.
9,377,925 B2  6/2016  Anderson et al.
(Continued)

FOREIGN PATENT DOCUMENTS

CN  1641561 A  7/2005
EP  1381237 A2  1/2004

OTHER PUBLICATIONS

Skype for Business, YouTube video, "Skype for Business: Step-by-step guide for new users," published Mar. 16, 2015, found at https://www.youtube.com/watch?v=7_c4zVJ739M\ (Year: 2015).*
(Continued)

*Primary Examiner* — Eric J Yoon
(74) *Attorney, Agent, or Firm* — Schwegman Lundberg & Woessner, P.A.

(57) ABSTRACT

System and techniques to implement a control bar on a display device for a communication session are described herein. A user interface is provided for the communication session to display on the display device. Here, the user interface includes a control bar and a session display area that provides a view of the communication session. In response to the number of users participating in the communication session increasing beyond a predefined criterion, the displayed user interface is updated by applying a modification to the control bar that includes moving the control bar from a current location to one of several pre-defined locations on the display device or reducing a size of the control bar. The session display area can then be expanded to occupy a space on the display device that was previously occupied by the control bar before the modification was applied to the control bar.

20 Claims, 9 Drawing Sheets

(51) Int. Cl.
 *G06F 3/0481* (2013.01)
 *H04L 12/24* (2006.01)
(58) Field of Classification Search
 CPC ..... G06F 3/04845; G06T 11/451; G09G 5/14; H04N 7/147; H04N 7/157; H04N 21/4316; H04N 7/15; H04L 41/22; H04L 65/1093
 See application file for complete search history.

(56) References Cited

U.S. PATENT DOCUMENTS

| | | | |
|---|---|---|---|
| 9,819,877 | B1 | 11/2017 | Faulkner et al. |
| 9,942,519 | B1* | 4/2018 | Pan .................... H04N 21/4316 |
| 2009/0199126 | A1 | 8/2009 | Kumar et al. |
| 2010/0162165 | A1 | 6/2010 | Addala et al. |
| 2015/0304366 | A1 | 10/2015 | Bader-natal et al. |
| 2016/0306504 | A1* | 10/2016 | Brunsch ............ H04M 1/72552 |
| 2016/0308920 | A1 | 10/2016 | Brunsch et al. |
| 2018/0375676 | A1* | 12/2018 | Bader-Natal ........ H04L 12/1822 |

OTHER PUBLICATIONS

"International Search Report and Written Opinion Issued in PCT Application No. PCT/US19/035277", dated Sep. 16, 2019, 15 Pages.
"Host ControlS In A Meeting", Retrieved From https://support.zoom.us/hc/en-us/articles/201362603-Host-Controls-in-a-Meeting, Nov. 2016, 4 Pages.
"iPhone and iPad BlueJeans app", Retrieved From https://support.bluejeans.com/knowledge/iOS-bluejeans-app, Retrieved on: Apr. 2, 2018, 4 Pages.
"Oracle Beehive Conferencing Java-based Client", Retrieved From https://web.archive.org/web/20121001023639/https:/docs.oracle.com/cd/E16671_01/bh.200/e25458/javaclient.htm, Oct. 1, 2012, 22 Pages.
Husse, Christoph, "Gotomeeting HTML5", Retrieved From https://artificialmind.blog/2015/12/14/gotomeeting-html5/, Dec. 14, 2015, 3 Pages.
McLean, Asha, "Amazon Chime to be charged per-use", Retrieved From http://www.zdnet.com/article/amazon-chime-to-be-charged-on-a-per-use-basis/, Mar. 13, 2018, 6 Pages.

\* cited by examiner

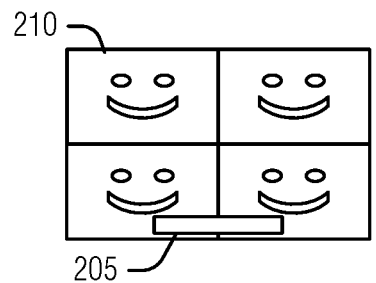
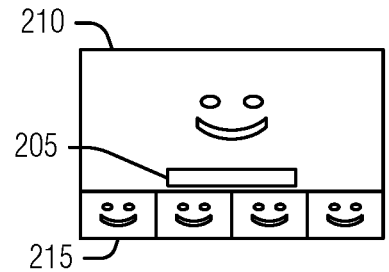
FIG. 2A  FIG. 2B
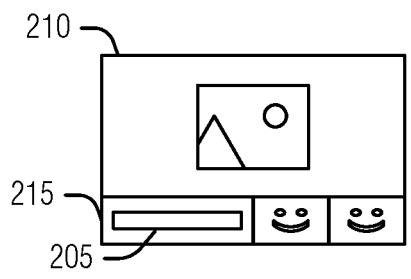
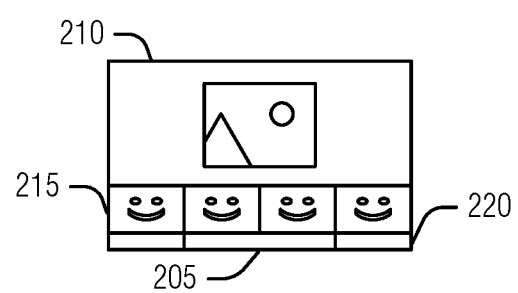
FIG. 2C  FIG. 2D
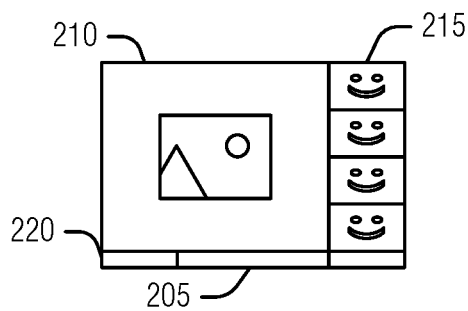
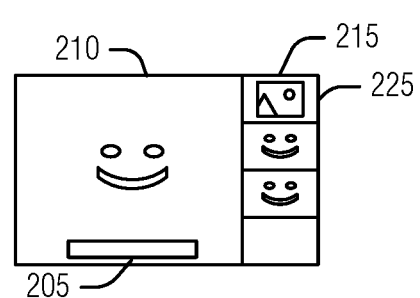
FIG. 2E  FIG. 2F

DISPLAY CONTROL TO IMPLEMENT A CONTROL BAR

BACKGROUND

Modern communications occur over a wide variety of technologies and physical media (e.g., radio wave, electrical signals, visible light, etc.). As the capabilities of these technologies have grown, so have the user interfaces used to communicate. From the simple pulse of the telegraph to the high fidelity voice and video we have today. The variety of interfaces for modern communications have a few commonalities, such as communication controls, application controls, and multiple display areas that provide views to participants in the communication, or shared content.

The application controls are typically found at the top of an application window for the communication application, or in a universal menu bar in some windowing systems. The communication controls are often placed relative to a primary display area into which either shared content or participants are shown. A variety of other aspects of the communication application or session can be shown as well.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIGS. 2A-2F illustrate example user interfaces for a communication session, according to an embodiment.

DETAILED DESCRIPTION

User interfaces for communication sessions or applications tend to be static, each element of the interface fixed with respect to each other. Some permit the user to rearrange portions of the user interface. However, missing from these user interfaces, is a user interface that is responsive to several elements of the communication session, such as the content in the primary display area or the number of users in the communication session. These arrangements have thus failed to effectively use the display area of display devices.

To address the issues of current communications application user interfaces, a unified control bar can effectively eliminate display area devoted to the communication application controls (e.g., application menu bar). Moreover, this control bar is modified in response to communication session factors to both efficiently use the display area while remaining intuitive and efficient for users. These factors can include a default view and control bar states for people and a different default view for content. Another factor can include large versus small communication sessions; detecting when they occur and responding to the change. The factors can also include people versus people and content. These factors then inform a display control to modify the control bar, enabling immersive views and behaviors, floating vs docked control bar states with user switching, responsive people and content grid view scaling, responsive people and content behaviors in passive or active rows, among other things. By following conversation states, a few to thousands of users (e.g., attendees) can reliably interact with other users or shared content across devices and environments, such as virtual reality, mobile phone, conference room configurations (such as a large screen, multiple microphones, etc.), and desktop computers, among others. The present disclosure thus is directed to an improved user interface for computing devices by improving the manner in which information is presented to make it easier for users to communicate.

Figure 1:
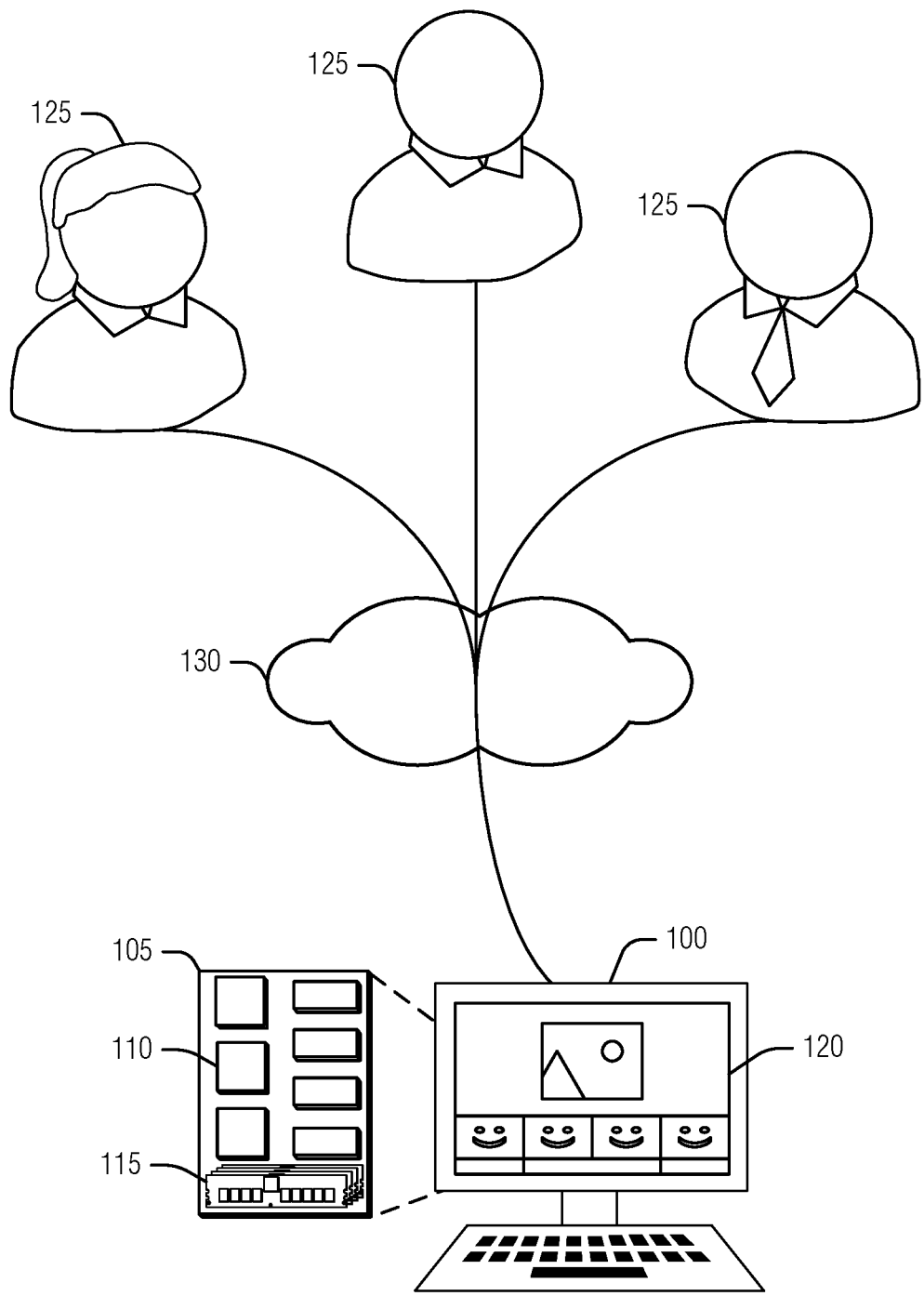
FIG. 1 is a block diagram of an example of an environment including a system with a display control to implement a control bar, according to an embodiment.

FIG. 1 is a block diagram of an example of an environment including a system 100 (e.g., a terminal, computer, tablet, mobile phone, etc.) with a display control 105 to implement a control bar, according to an embodiment. As illustrated, the environment includes a number of users 125 (e.g., communication attendees, participants, etc.) connected to the system 100 via a network 130. The system 100 includes the display control 105 that provides (e.g., controls, renders, drives, etc.) a user interface 120 on a display device included in the system 100.

The display control 105 includes processing circuitry 110 and a memory 115, which is a machine readable medium such as random access memory (RAM), a solid state drive (SSD), or the like. The display control 105 can be a motherboard, application specific integrated circuit (ASIC), field programmable gate array (FPGA), a graphical processing unit (GPU), central processing unit (CPU), or other combination of hardware with the ability to provide the user interface 120. By the user interface 120, the display control 105 provides a control bar in both unique form and position to simplify user 125 interaction with a communication session, increasing the usefulness and efficiency of the communication session for the user 125. To accomplish the benefits of the described control bar, the processing circuitry 110 is arranged to provide the user interface 120 for the communication session on a display device. The user interface 120 includes the control bar and a session display area. The session display area provides a view of the communication session. In an example, the view of the communication session is one or more avatars or representations of the users 125. In an example, a representation can take the form of a number, indicating a number of users 125 not visible in the session display area. In an example, selecting the number representation provokes the processing circuitry 110 to display these invisible users 125.

The user interface 120 can include several display areas, including a primary display area. The session display area can occupy the primary display area, or it can occupy a secondary display area, such as a lower portion of the user interface, or a side of the user interface. When the session display area does not occupy the primary display area, some other type of content, such as shared content, occupies the primary display area. Shared content is content that is visible to the users 125 at each user's terminal. Another type of content is private content that is not shared (e.g., visible) to the other users 125 by virtue of the communication session, although this doesn't preclude two different users from opening the same file and viewing it at the same time, for example. In an example, the primary display area is adjacent to the secondary display area. In an example, the primary display area shares an edge with the secondary display area.

In an example, the control bar is a unified control bar that includes communication controls and communication application controls. The difference between these two controls are as follows: the communication application controls refer to a menu that has become standard in most modern applications. It generally occupies a menu bar at the top of the supplication window, and includes such menu items as "File," "Edit," "Help," and the like. In contrast, the communication controls, in modern communication applications, include such things as "Hang Up," "Share Screen," "Hold," and the like. Typically, the communication controls are not in a menu bar, but rather a set of collected icons placed closer to a user's attention (e.g., under a speaking user 125) in order to provide ready access to communication functions during a communication session. In the unified control bar, all of these elements are collected into a bar, with a subset of the elements visible in the bar as icons, and a drawer icon that can be manipulated by the user to expose the remaining elements (e.g., as another bar, as a menu system, etc.).

In an example, the user interface includes an add-on interaction area. The add-on interaction area is an additional icon area where add-ons (e.g., plugins, extensions, etc.) can be accessed by the user 125. This add-on interaction area typically provides the ability to conceal, or hide, its representation in the user interface 120. In an example, the user interface 120 has no other fixed menu interfaces than the unified control bar or the add-on interaction area. Thus, the unified control bar replaces elements of traditional user interfaces, such as the application menu bar.

The processing circuitry 110 is arranged to track the number of users participating in the communication session. The number of users tends to affect the size or representation of the communication session display. This can affect a user's experience with the user interface 120 if, for example, the size of the communication session display is too small to convey a sense of the communication users 125 to a user 125. In an example, the processing circuitry 120 is arranged to track what type of content is in the primary display area. For example, is the communication session display area is in the primary display area, it has greater space to expand. However, if shared content is in the primary display area, not only is there less room for the communication session display, but there is also often a desire to avoid the control bar from obscuring any of the shared content so that the users 125 can properly interact with the shared content. Thus, the processing circuitry 120 is arranged to, in response to the number of users 125 going beyond (e.g., exceeding, falling under, etc.) a predefined criterion (e.g., a threshold), update the user interface 120 by modifying (e.g., applying a modification to) the control bar. In an example, the modification to control bar includes moving the control bar from a current location to one of several pre-defined locations in the user interface 102. In an example, the modification includes reducing the size of the control bar. In an example, a predefined location of the several predefined locations shares an edge with the session display area. In an example, the predefined location is below and spans the session display area. In an example, the predefined location is empty space in a secondary display area, where the rest of the secondary display area is occupied by the communication session display area.

In an example, the modification occurs during a user-transition window only. Here, the user-transition window is an event detectable by the processing circuitry 120 in which users 125 are unlikely to be bothered by a change to the user interface 120. Example user-transition window events include joining the communication session, changing the content type of the primary display area, changing a size of the user interface 120 (e.g., expanding a window of the user interface 120, entering "full screen" mode, etc.), moving a window of the user interface 120, among others.

The processing circuitry 120 is arranged to expand the session display area to occupy a space in the user interface 120 that was previously occupied by the control bar before the modification was applied to the control bar. Thus, if the control bar is moved out of the secondary display area and docked at the bottom of the user interface 120, then the communication session display area can expand to fill the secondary display area.

In an example, the processing circuitry 120 is arranged to move the session display area into the primary display area. In this example, the control bar can be moved to float over the primary display in response to moving the session display area into the primary display area. This change in content type of the primary display area is often beneficial because, for example, it often does not interfere with the user experience when a small portion of a representation of a speaker is partially covered, and provides greater space to display more users 125 of the communication session.

In an example, the processing circuitry 120 is arranged to receive user input to float the communication session display area. In response, the session display area is floated in the primary display area. In an example, the one of the pre-defined locations is defined respective to the session display area. In an example, the one of the predefined locations is docked to or floating over the session display area. These examples illustrate aspects of what is sometimes called a front-of-room interface. Consider that a user 125 is directing a meeting and sharing content with other users 125. This meeting director is often more interested in manipulating the content than the entire scope of the other attendees, but is probably interested in a given speaker. Thus, the primary display area fills the length and breadth of the user interface 120 while a floating window that contains a representation of a speaker is provided to the director in order to know who is speaking (e.g., asking a question). The control bar is relative to this floating window of the session display area, such as docked to one side of the floating window, or floating within the window.

The dynamic yet intuitive placement of the control bar based on the number of users, and of displayed content, keeps communication session controls out of the way, while remaining convenient and response. FIGS. 2A-7 graphically illustrates several aspects of the user interface 120 as described above.

FIGS. 2A-2F illustrate examples user interfaces for a communication session, according to an embodiment. FIG. 2A is an example of the user interface in which the primary display area 210 spans the length and breadth of the user interface. The content type of the primary display area is the communication session display area, here illustrated as four representations of different users. The control bar 205 floats over (e.g., partially obscures) the communication session display area in the primary display area 210.

FIG. 2B differs from the example of FIG. 2A in the addition of the secondary display area 215. Here, the communication session display area occupies both the primary display area 210 and the secondary display area 215. Again, the control bar 205 float over the communication session display area in the primary display area 210. This arrangement is useful when, for example, the number of users exceeds a threshold, or when a representation of a primary speaker is most useful, and the representations of additional users provide context to speech with jarring changes in focus, such as a panel led by a primary speaker with other users asking questions.

FIG. 2C illustrates a change in the content type of the primary display area 210. Here, shared content occupies the entire primary display area 210 and is not obstructed by the control bar 205. This is useful because, often, any pixel of the shared content could be important, and adjusting, or manually moving the control bar 205 by the users would interrupt their experience in the communication session. The control bar 205 is moved to a negative space in the secondary display area 215. The negative space is created when the communication session display area does not consume the entire secondary display area 215.

FIG. 2D illustrates a tertiary display area 220 that makes room for the control bar 205 when, for example, the number of users in the communication grows and more space is helpful for the communication session display area 215. The tertiary display area 220 can be "docked" at the bottom of the user interface. In an example, the tertiary display area 220 shares an edge with the secondary display area 215. Thus, if the secondary display area 215 is not at the bottom, but rather at the left, the right, or on top of the primary display area 210, the tertiary display area 220 is in between the primary display area 210 and the secondary display area 215, or on the other side of the secondary display area 215 from the primary display area 210. Thus, the tertiary display area 220 can be docked at the bottom, top, left, or right of the primary display area 210.

In an example, the secondary display area 215 can be hidden. In an example, the tertiary display area 220 can be hidden, for example, after a period of inactivity. In an example, either the secondary display area 215 or the tertiary display area 220 can be overlaid upon the primary display area 210. An overlay operates like docking, in which the element is at a fixed position relative to the overlaid element, however, the overlaid element is semi-transparent and the overlaid element occupies space beneath the overlay. Such an arrangement can be useful, for example, when the primary display area 210 is in an immersive, edge-to-edge mode. The overlays can then pop-out under a certain circumstance, such as a gesture, key combination, etc., so that the user can perform an action, and then again be withdrawn.

FIG. 2E illustrates an alternative position of the secondary display area 215 to the right of the primary display area 210. Here, the tertiary display area 220 shares an edge with both the primary display area 210 and the secondary display area 215. Again, the primary display area contains content other than the communication session display area, and so the control bar does not float in the primary display area 210.

FIG. 2F illustrates a change to the content type of the primary display area 210 from that of FIG. 2E; specifically, the use of the primary display area 210 to hold the communication session display area while the shared content 225 is transformed into a representation of similar size to user representations in the secondary display area 215. Here, the tertiary display area 220 is eliminated to provide more space in the user interface for the primary display area 210 and the secondary display area 215. Accordingly, the menu bar 205 is floated in the primary display area 210.

FIGS. 2A-2F illustrate several predefined locations into which the control bar 205 is moved in accordance with the number of users participating in the communication session, as well as what content is the focus of the communication session (e.g., as defined by what type of content is in the primary display area 210). By iterating through these predefined locations, the controls of the control bar do not interfere with the user's experience while exhibit predictable behavior, making it easier for the users to access the controls.

Figure 3:
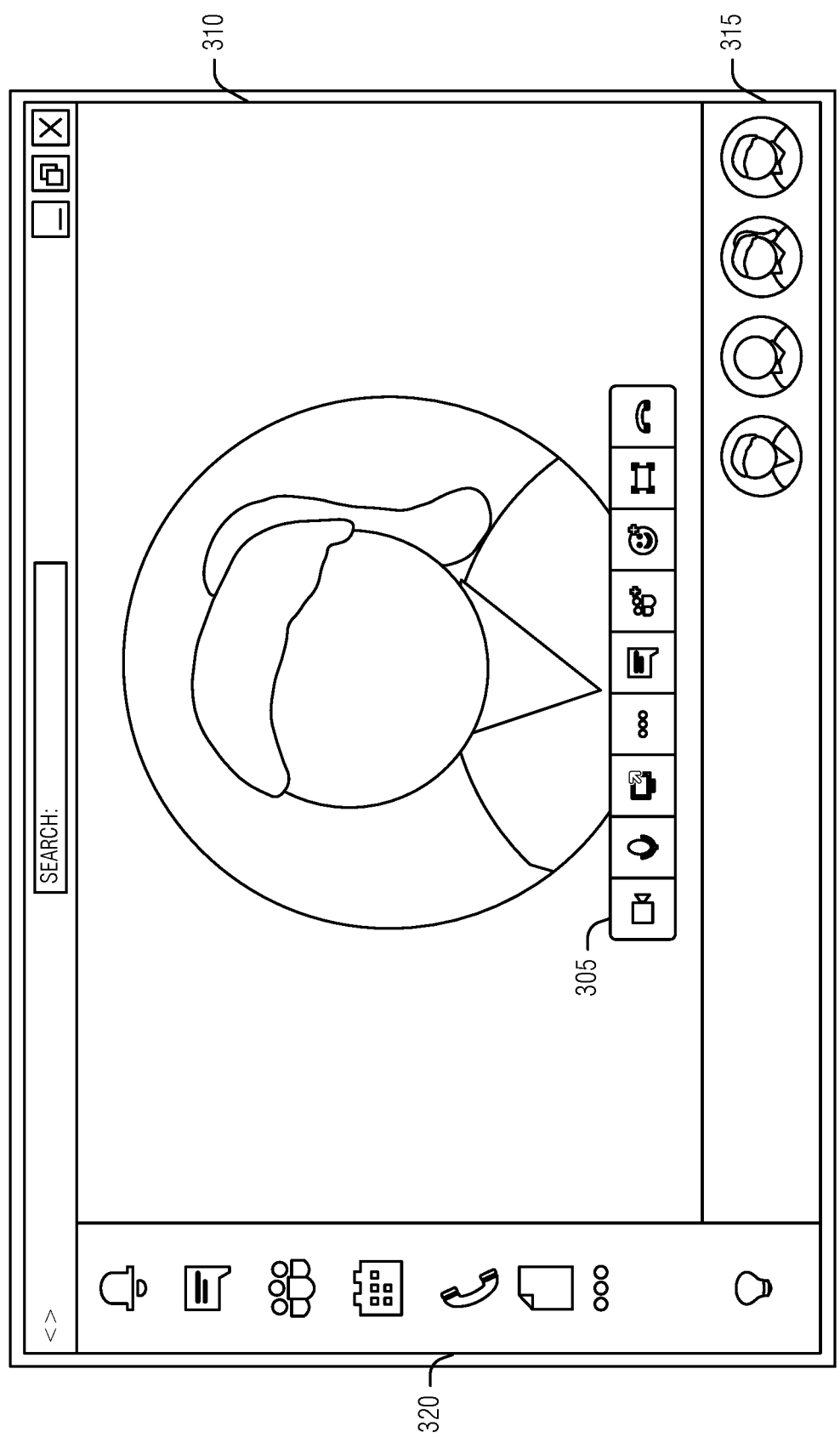
FIG. 3 illustrates an example of a user interface for a communication session where a primary display area and a secondary display area include a communication session display area, according to an embodiment.

FIG. 3 illustrates an example of a user interface for a communication session where a primary display area 310 and a secondary display area 315 include a communication session display area, according to an embodiment. Here, the control bar 305 is floating in the primary display area 310. The user interface also includes an add-on interaction area 320 that can, in an example, operate as a drawer sliding over the top of the other display areas. The icons in the add-on interaction area 320 are, from the top, an activity icon, a chat icon, a teams (or other group or person selector) icon, a calendar icons, a calls icon, an ellipses icon that, when selected, provides addition add-on interaction icons, and a meetings icon at the bottom. The secondary display area 315 illustrates a communication session display area that does not fill the secondary display area 315, creating a negative space.

Figure 4:
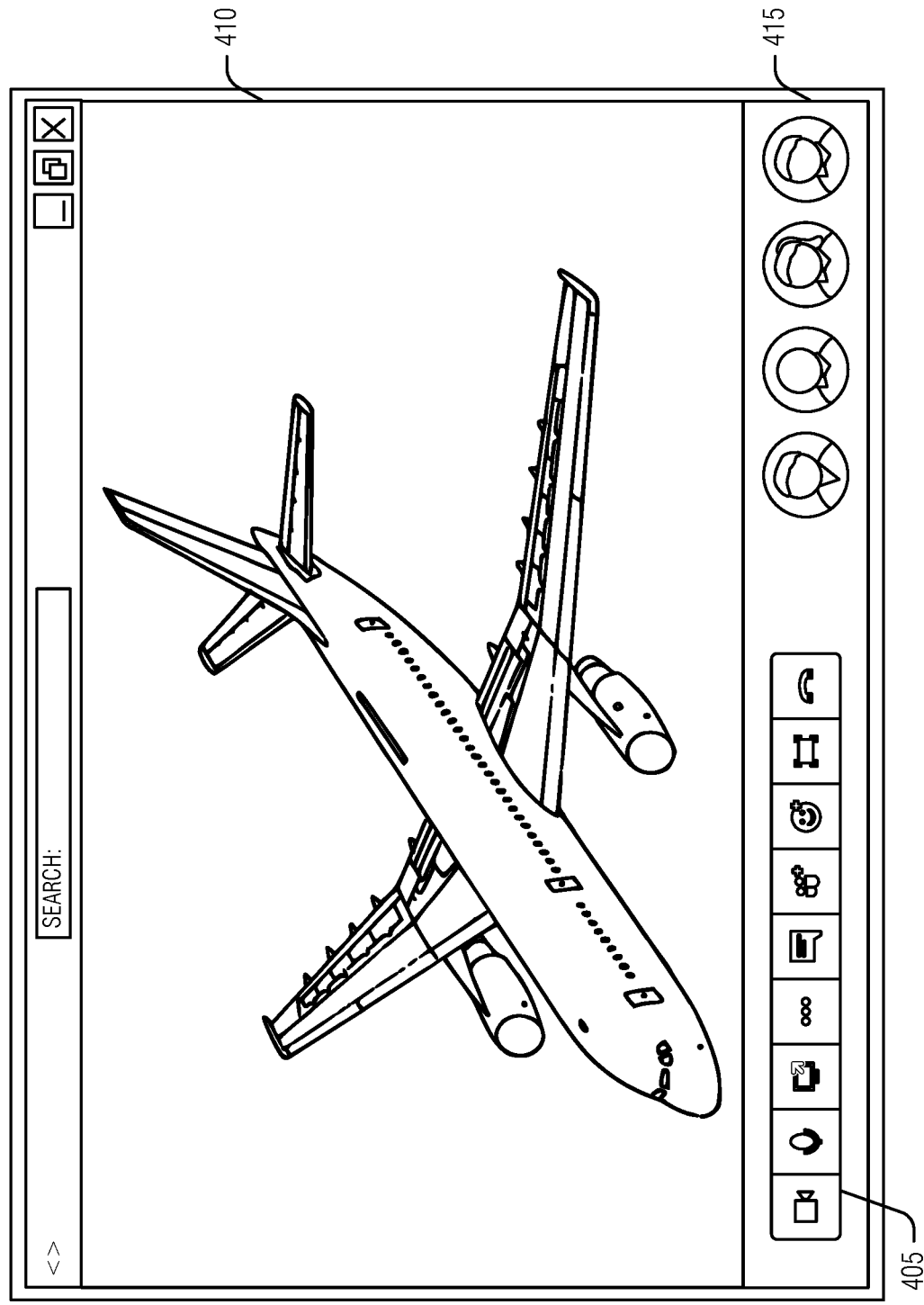
FIG. 4 illustrates an example of a user interface for a communication session where a primary display area includes shared content, and a secondary display area includes a communication session display area, according to an embodiment.

FIG. 4 illustrates an example of a user interface for a communication session where a primary display area 410 includes shared content, and a secondary display area 415 includes a session display area, according to an embodiment. As described above, a control bar 405 is moved from the primary display area 410 to negative space in the secondary display area 415 so as not to obscure the shared content.

Figure 5:
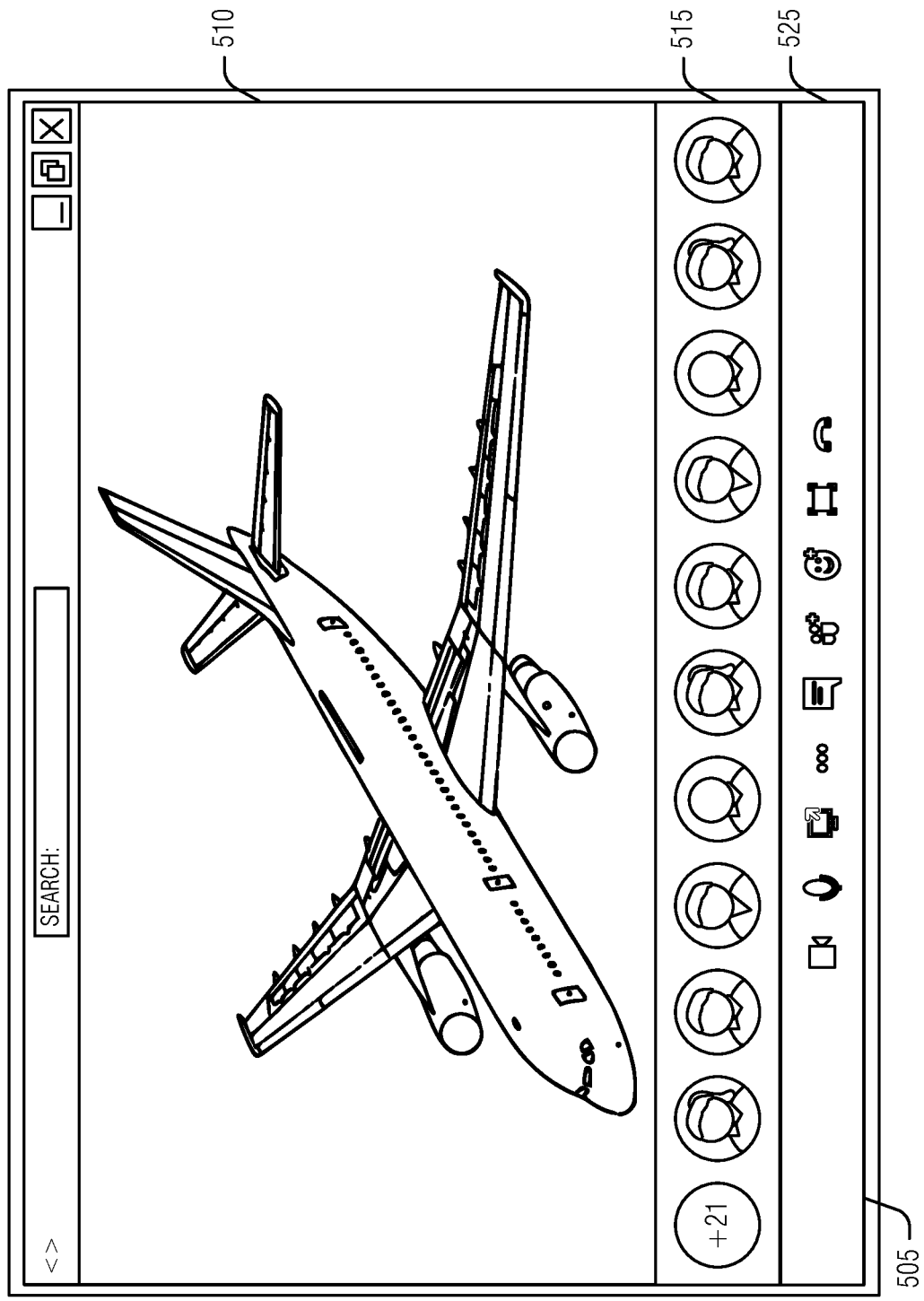
FIG. 5 illustrates an example of a user interface for a communication session where a primary display area includes shared content, and a secondary display area includes a communication session display area, and a tertiary display area include a control bar, according to an embodiment.

FIG. 5 illustrates an example of a user interface for a communication session where a primary display area 510 includes shared content, and a secondary display area 515 includes a session display area, and a tertiary display area 525 includes a control bar 505, according to an embodiment. Also, the representation of a number "+21" is an interactive representation of a number of additional users that are part of the communication session. This formulation of the user interface address uses the tertiary display area 525 to expand the communication session display area in the secondary display area 515.

Figure 6:
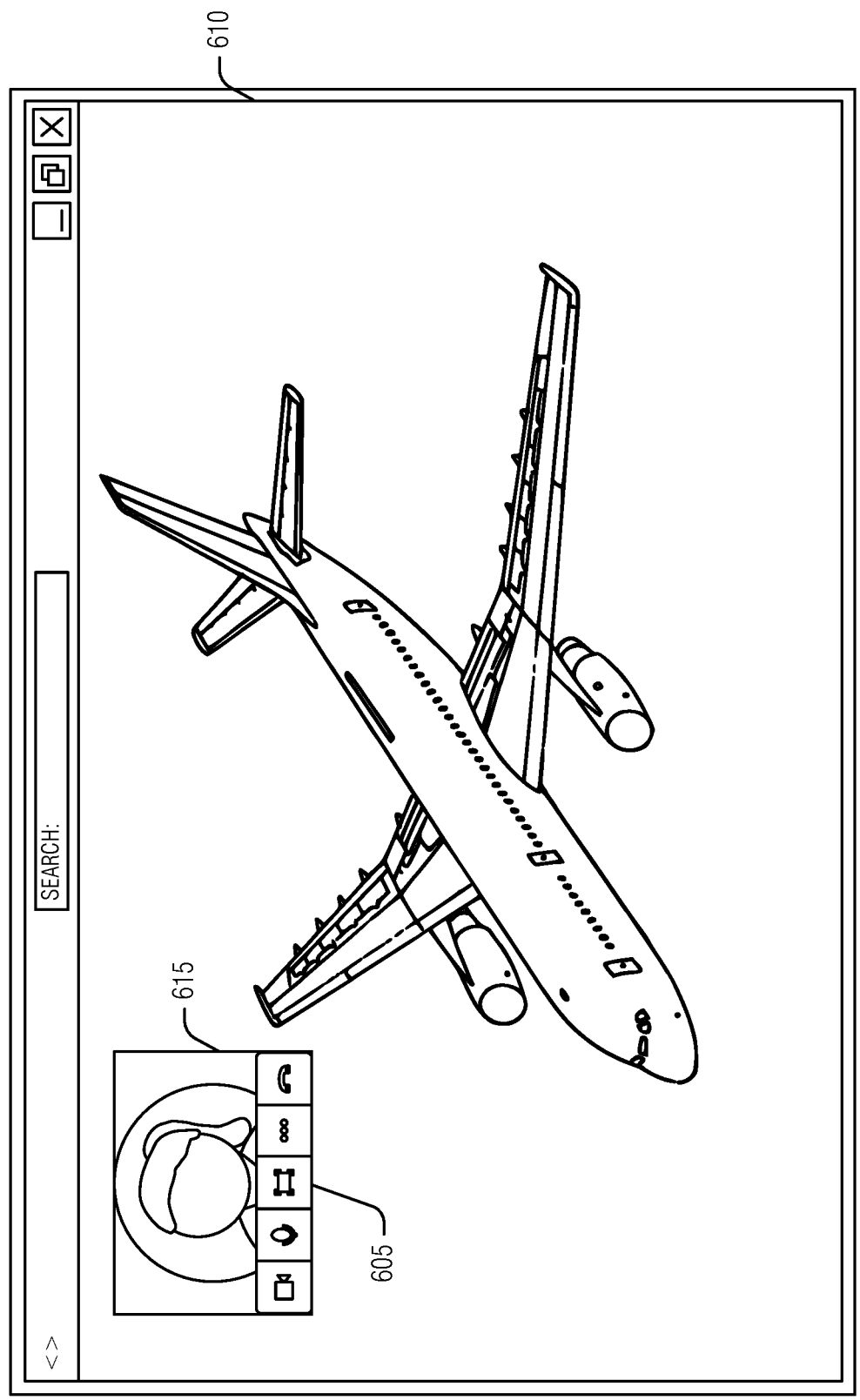
FIG. 6 illustrates an example of a user interface for a communication session where a primary display area includes shared content, and a communication session display area with control bar float over the primary display area, according to an embodiment.

FIG. 6 illustrates an example of a user interface for a communication session where a primary display area 610 includes shared content, and a session display area 615 with control bar 605 float over the primary display area 610, according to an embodiment. In an example, the control bar 605 is docked to a side (e.g., the bottom or the right) of the communication session display area 615. In an example, the control bar 605 floats within the communication session display area 615. In either case, the control bar 605 is positioned relative to the communication session display area 615 such that, when the communication session display area 615 is moved, so is the control bar 605.

This example of the user interface represents a "front of room" optimization, whereby a director of the meeting can manipulate the communication session display area 615 to provide the most flexibility in interacting with the shared content while still having a sense of the attendees. In an example, the only representation of a user in the communication session display area 615 is a current speaker, or the last speaker if there is no current speaker. In an example, the communication session display area 615 can be docked into a user interface element of the shared content. For example, if the shared content where a forum application with a stacked menu on one side, the communication session display area 615 is added to the stacked menu, moving with the elements of the shared content as if it where one of them as the director manipulated the shared content. In an example, the communication session display area 615 can be rendered outside of the user interface, providing a monitor of the communications session while the user, for example, works on non-shared content on her desktop.

Figure 7:
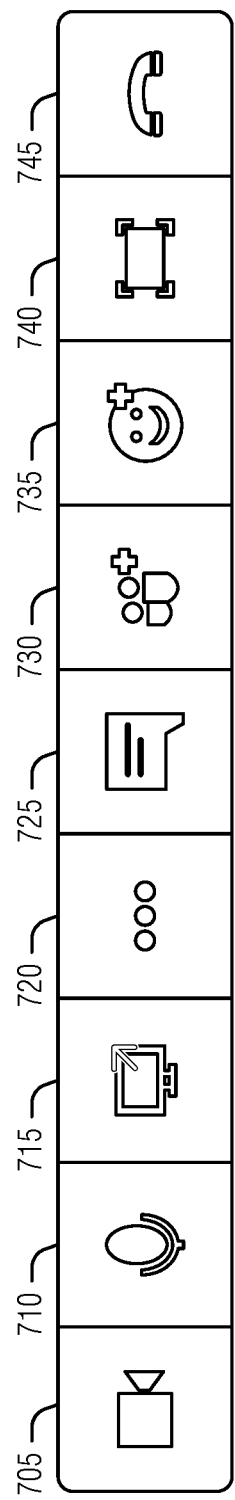
FIG. 7 illustrates an example of a unified control bar for a communication session, according to an embodiment.

FIG. 7 illustrates an example of a unified control bar for a communication session, according to an embodiment. The control bar includes communication controls, such as video muting 705, audio muting 715, screen sharing 715, chatting 725, and meeting disengagement 745, along with communication application controls, such as adding a group 730, adding a user 735, going "full screen" 740. Thus, the illustrated control bar is a unified control bar, bring together both controls specific to the communication session as well as application controls (e.g., preferences, help, etc.).

The ellipses 720 icon represents additional control elements that a user can access by selecting the ellipses 720. These can be access via a drop-down menu, a dialog window, or other techniques to access menu controls. In examples of control bar modification that include reducing the size of the control bar, additional icons can be eliminated from the control bar and added to the list accessed via the ellipses. In an example, the icons themselves can be shrunk.

In an example, the icons displayed on the unified control bar are context dependent. Thus, icons can be re-arranged such that they are close to activities within the user interface upon which they operate. For example, if the communication session display area is in the secondary display area to the right of the primary display area, communication session controls can be moved to the right on the unified control bar. In an example, icons can be hidden into the ellipses icon 720 control when they rank lower than other icons for interacting with elements on the screen or primary display.

Figure 8:
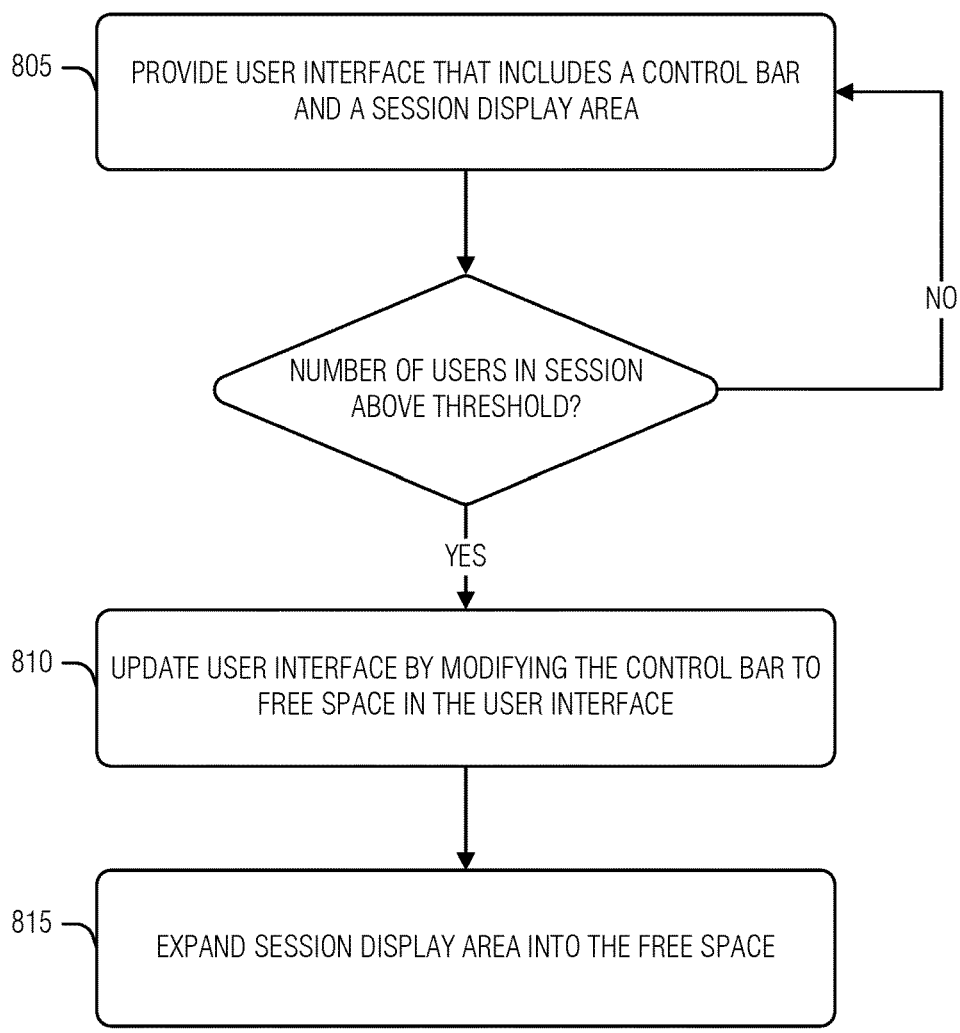
FIG. 8 illustrates an example of a method to implement a control bar on a display device for a communication session, according to an embodiment.

FIG. 8 illustrates an example of a method 800 to implement a control bar on a display device for a communication session, according to an embodiment. The operations of the method 800 are implemented in hardware, such as that described above or below (e.g., processing circuitry).

At operation 805, a user interface for a communication session is provided for display on a display device. Here, the user interface includes a control bar and a session display area. The session display area provides a view of the communication session. In an example, the control bar is a unified control bar that includes communication controls and communication application controls. In an example, the user interface includes an add-on interaction area. In an example, the user interface has no other fixed menu interfaces. In an example, the user interface includes a primary display area. In an example, the primary display area is adjacent to the session display area.

The method 800 continues, in response to a number of users participating in the communication session increasing beyond a predefined criterion, with operations 810 and 815.

At operation 810, the displayed user interface is updated by applying a modification to the control bar. In an example, the modification includes moving the control bar from a current location to one of several pre-defined locations on the display device. In an example, the modification includes reducing the size of the control bar. In an example, a predefined location of the several predefined locations shares an edge with the session display area. In an example, the predefined location is below and spans the session display area.

At operation 815, the session display area is expanded to occupy a space on the display device that was previously occupied by the control bar before the modification was applied to the control bar.

In an example, the method 800 can be extended to include moving the session display area into the primary display area and moving the control bar to float over the primary display are in response to moving the session display area into the primary display area.

In an example, the method 800 can be extended to include receiving user input to float the session display area. In response, the session display area is floated in the primary display area. In an example, the one of the predefined locations is defined respective to the session display area. In an example, the one of the predefined locations is docked to or floating over the session display area.

Figure 9:
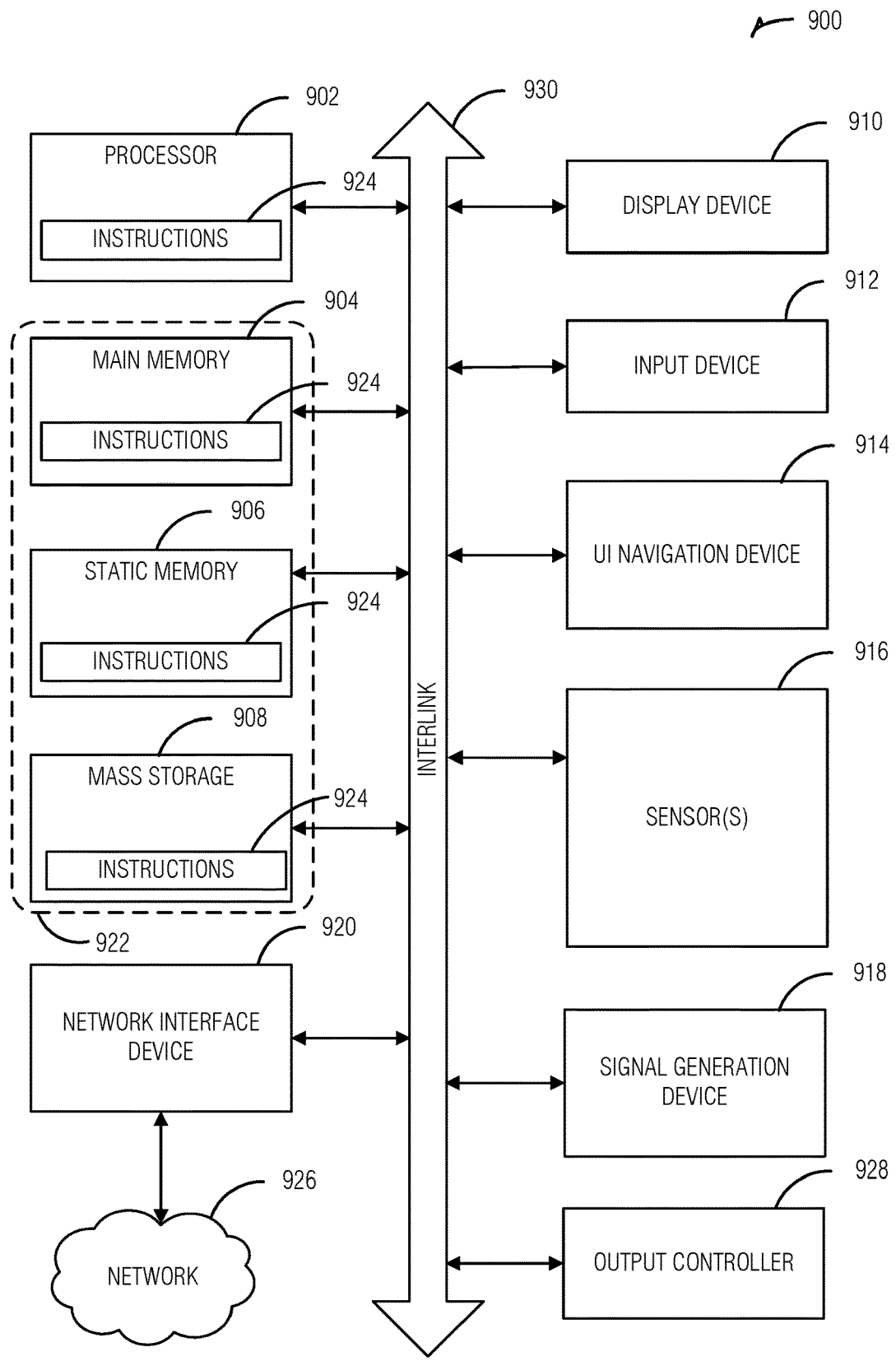
FIG. 9 is a block diagram illustrating an example of a machine upon which one or more embodiments can be implemented.

FIG. 9 illustrates a block diagram of an example machine 900 upon which any one or more of the techniques (e.g., methodologies) discussed herein can perform. Examples, as described herein, can include, or can operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 can operate as a standalone device or can be connected (e.g., networked)

to other machines. In a networked deployment, the machine 900 can operate in the capacity of a server machine, a client machine, or both in server-client network environments. In an example, the machine 900 can act as a peer machine in peer-to-peer (P2P) (or other distributed) network environment. The machine 900 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 can include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which can communicate with each other via an interlink (e.g., bus) 930. The machine 900 can further include a display unit 910, an alphanumeric input device 912 (e.g., a keyboard), and a user interface (UI) navigation device 914 (e.g., a mouse). In an example, the display unit 910, input device 912 and UI navigation device 914 can be a touch screen display. The machine 900 can additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 can include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 can be, or include, a machine readable medium 922 on which is stored one or more sets of data structures or instructions 924 (e.g., software) embodying or utilized by any one or more of the techniques or functions described herein. The instructions 924 can also reside, completely or at least partially, within any of registers of the processor 902, the main memory 904, the static memory 906, or the mass storage 908 during execution thereof by the machine 900. In an example, one or any combination of the hardware processor 902, the main memory 904, the static memory 906, or the mass storage 908 can constitute the machine readable media 922. While the machine readable medium 922 is illustrated as a single medium, the term "machine readable medium" can include a single medium or multiple media (e.g., a centralized or distributed database, and/or associated caches and servers) configured to store the one or more instructions 924.

The term "machine readable medium" can include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 can be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 can include one or more physical jacks (e.g., Ethernet, coaxial, or phone jacks) or one or more antennas to connect to the communications network 926. In an example, the network interface device 920 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

ADDITIONAL NOTES & EXAMPLES

Example 1 is a display control device to implement a control bar on a display device for a communication session, the display control device comprising: processing circuitry; and memory including instructions that, when executed by the processing circuitry, cause the processing circuitry to perform operations comprising: providing a user interface for the communication session for display on the display device, the user interface including a control bar and a session display area providing a view of the communication session; and in response to a number of users participating in the communication session increasing beyond a predefined criterion: updating the displayed user interface by applying a modification to the control bar by moving the control bar from a current location to one of several predefined locations on the display device or reducing a size of the control bar; and expanding the session display area to occupy a space on the display device that was previously occupied by the control bar before the modification was applied to the control bar.

In Example 2, the subject matter of Example 1 includes, wherein a predefined location of the several predefined locations shares an edge with the session display area.

In Example 3, the subject matter of Example 2 includes, wherein the predefined location is below and spans the session display area.

In Example 4, the subject matter of Examples 1-3 includes, wherein the control bar is a unified control bar that includes communication controls and communication application controls.

In Example 5, the subject matter of Example 4 includes, wherein the user interface includes an add-on interaction area, and wherein the user interface has no other fixed menu interfaces.

In Example 6, the subject matter of Examples 1-5 includes, wherein the user interface includes a primary display area.

In Example 7, the subject matter of Example 6 includes, wherein the primary display area is adjacent to the session display area.

In Example 8, the subject matter of Example 7 includes, wherein the operations comprise: moving the session display area into the primary display area; and moving the control bar to float over the primary display are in response to moving the session display area into the primary display area.

In Example 9, the subject matter of Examples 6-8 includes, wherein the operations comprise: receiving user input to float the session display area; and floating the session display area in the primary display area.

In Example 10, the subject matter of Example 9 includes, wherein the one of the predefined locations is defined respective to the session display area.

In Example 11, the subject matter of Example 10 includes, wherein the one of the predefined locations is docked to or floating over the session display area.

Example 12 is a display control method to implement a control bar on a display device for a communication session, the display control method comprising: providing a user interface for the communication session for display on the display device, the user interface including a control bar and a session display area providing a view of the communication session; and in response to a number of users participating in the communication session increasing beyond a predefined criterion: updating the displayed user interface by applying a modification to the control bar by moving the control bar from a current location to one of several pre-defined locations on the display device or reducing a size of the control bar; and expanding the session display area to occupy a space on the display device that was previously occupied by the control bar before the modification was applied to the control bar.

In Example 13, the subject matter of Example 12 includes, wherein a predefined location of the several pre-defined locations shares an edge with the session display area.

In Example 14, the subject matter of Example 13 includes, wherein the predefined location is below and spans the session display area.

In Example 15, the subject matter of Examples 12-14 includes, wherein the control bar is a unified control bar that includes communication controls and communication application controls.

In Example 16, the subject matter of Example 15 includes, wherein the user interface includes an add-on interaction area, and wherein the user interface has no other fixed menu interfaces.

In Example 17, the subject matter of Examples 12-16 includes, wherein the user interface includes a primary display area.

In Example 18, the subject matter of Example 17 includes, wherein the primary display area is adjacent to the session display area.

In Example 19, the subject matter of Example 18 includes, moving the session display area into the primary display area; and moving the control bar to float over the primary display are in response to moving the session display area into the primary display area.

In Example 20, the subject matter of Examples 17-19 includes, receiving user input to float the session display area; and floating the session display area in the primary display area.

In Example 21, the subject matter of Example 20 includes, wherein the one of the predefined locations is defined respective to the session display area.

In Example 22, the subject matter of Example 21 includes, wherein the one of the predefined locations is docked to or floating over the session display area.

Example 23 is a machine readable medium including instructions that, when executed by processing circuitry, cause the processing circuitry to perform operations comprising: providing a user interface for the communication session for display on the display device, the user interface including a control bar and a session display area providing a view of the communication session; and in response to a number of users participating in the communication session increasing beyond a predefined criterion: updating the displayed user interface by applying a modification to the control bar by moving the control bar from a current location to one of several pre-defined locations on the display device or reducing a size of the control bar; and expanding the session display area to occupy a space on the display device that was previously occupied by the control bar before the modification was applied to the control bar.

In Example 24, the subject matter of Example 23 includes, wherein a predefined location of the several pre-defined locations shares an edge with the session display area.

In Example 25, the subject matter of Example 24 includes, wherein the predefined location is below and spans the session display area.

In Example 26, the subject matter of Examples 23-25 includes, wherein the control bar is a unified control bar that includes communication controls and communication application controls.

In Example 27, the subject matter of Example 26 includes, wherein the user interface includes an add-on interaction area, and wherein the user interface has no other fixed menu interfaces.

In Example 28, the subject matter of Examples 23-27 includes, wherein the user interface includes a primary display area.

In Example 29, the subject matter of Example 28 includes, wherein the primary display area is adjacent to the session display area.

In Example 30, the subject matter of Example 29 includes, wherein the instructions comprise: moving the session display area into the primary display area; and moving the control bar to float over the primary display are in response to moving the session display area into the primary display area.

In Example 31, the subject matter of Examples 28-30 includes, wherein the instructions comprise: receiving user input to float the session display area; and floating the session display area in the primary display area.

In Example 32, the subject matter of Example 31 includes, wherein the one of the predefined locations is defined respective to the session display area.

In Example 33, the subject matter of Example 32 includes, wherein the one of the predefined locations is docked to or floating over the session display area.

Example 34 is a display control system to implement a control bar on a display device for a communication session, the display control system comprising: means for providing a user interface for the communication session for display on the display device, the user interface including a control bar and a session display area providing a view of the communication session; means for determining that a number of user participating in the communication session increased beyond a predefined criterion; means for updating the displayed user interface, in response to the number of users increasing beyond the predefined criterion, by applying a modification to the control bar by moving the control bar from a current location to one of several pre-defined locations on the display device or reducing a size of the control bar; and means for expanding the session display area to occupy a space on the display device that was previously occupied by the control bar before the modification was applied to the control bar.

In Example 35, the subject matter of Example 34 includes, wherein a predefined location of the several pre-defined locations shares an edge with the session display area.

In Example 36, the subject matter of Example 35 includes, wherein the predefined location is below and spans the session display area.

In Example 37, the subject matter of Examples 34-36 includes, wherein the control bar is a unified control bar that includes communication controls and communication application controls.

In Example 38, the subject matter of Example 37 includes, wherein the user interface includes an add-on interaction area, and wherein the user interface has no other fixed menu interfaces.

In Example 39, the subject matter of Examples 34-38 includes, wherein the user interface includes a primary display area.

In Example 40, the subject matter of Example 39 includes, wherein the primary display area is adjacent to the session display area.

In Example 41, the subject matter of Example 40 includes, means for moving the session display area into the primary display area; and means for moving the control bar to float over the primary display are in response to moving the session display area into the primary display area.

In Example 42, the subject matter of Examples 39-41 includes, means for receiving user input to float the session display area; and means for floating the session display area in the primary display area.

In Example 43, the subject matter of Example 42 includes, wherein the one of the predefined locations is defined respective to the session display area.

In Example 44, the subject matter of Example 43 includes, wherein the one of the predefined locations is docked to or floating over the session display area.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A display control device to implement a control bar on a display device for a communication session, the display control device comprising:
   processing circuitry; and
   memory including instructions that, when executed by the processing circuitry, cause the processing circuitry to perform operations comprising:
      providing a user interface for the communication session for display on the display device, the user interface including a control bar and a session display area providing a view of the communication session;
      detecting an increase in a number of users connected to the communication session; and
      in response to the number of users connected to the communication session increasing beyond a pre-defined criterion:
         updating the displayed user interface by applying a modification to the control bar by moving the control bar from a current location to one of several pre-defined locations on the display device or reducing a size of the control bar; and
         expanding the session display area to occupy a space on the display device that was previously occupied by the control bar before the modification was applied to the control bar, wherein before the expanding of the session display area, the session display area includes a plurality of graphical representations that each represent different users connected to the communication session.

2. The display control device of claim 1, wherein a predefined location of the several predefined locations shares an edge with the session display area.

3. The display control device of claim 1, wherein the control bar is a unified control bar that includes communication controls and communication application controls.

4. The display control device of claim 1, wherein the user interface includes a primary display area.

5. The display control device of claim 4, wherein the primary display area is adjacent to the session display area.

6. The display control device of claim 5, wherein the operations further comprise:
   moving the session display area into the primary display area; and
   moving the control bar to float over the primary display area in response to moving the session display area into the primary display area.

7. The display control device of claim 4, wherein the operations further comprise:
   receiving user input to float the session display area; and
   floating the session display area in the primary display area.

8. A display control method to implement a control bar on a display device for a communication session, the display control method comprising:
   providing a user interface for the communication session for display on the display device, the user interface including a control bar and a session display area providing a view of the communication session;
   detecting an increase in a number of users connected to the communication session; and
   in response to the number of users connected to the communication session increasing beyond a predefined criterion:
      updating the displayed user interface by applying a modification to the control bar by moving the control bar from a current location to one of several pre-defined locations on the display device or reducing a size of the control bar; and
      expanding the session display area to occupy a space on the display device that was previously occupied by the control bar before the modification was applied to the control bar, wherein before the expanding of the session display area, the session display area includes a plurality of graphical representations that each represent different users connected to the communication session.

9. The display control method of claim 8, wherein a predefined location of the several predefined locations shares an edge with the session display area.

10. The display control method of claim 8, wherein the control bar is a unified control bar that includes communication controls and communication application controls.

11. The display control method of claim 8, wherein the user interface includes a primary display area.

12. The display control method of claim 11, wherein the primary display area is adjacent to the session display area.

13. The display control method of claim 12, further comprising:
   moving the session display area into the primary display area; and
   moving the control bar to float over the primary display area in response to moving the session display area into the primary display area.

14. The display control method of claim 11, further comprising:
   receiving user input to float the session display area; and
   floating the session display area in the primary display area.

15. A display control system to implement a control bar on a display device for a communication session, the display control system comprising:
   means for providing a user interface for the communication session for display on the display device, the user interface including a control bar and a session display area providing a view of the communication session;
   means for detecting an increase in a number of users connected to the communication session;
   means for determining that the number of user connected to the communication session increased beyond a predefined criterion;
   means for updating the displayed user interface, in response to the number of users increasing beyond the predefined criterion, by applying a modification to the control bar by moving the control bar from a current location to one of several pre-defined locations on the display device or reducing a size of the control bar; and
   means for expanding the session display area to occupy a space on the display device that was previously occupied by the control bar before the modification was applied to the control bar, wherein before the expanding of the session display area, the session display area includes a plurality of graphical representations that each represent different users connected to the communication session.

16. The display control system of claim 15, wherein a predefined location of the several predefined locations shares an edge with the session display area.

17. The display control system of claim 15, wherein the control bar is a unified control bar that includes communication controls and communication application controls.

18. The display control system of claim 15, wherein the user interface includes a primary display area.

19. The display control system of claim 18, wherein the primary display area is adjacent to the session display area.

20. The display control system of claim 19, further comprising:
- means for moving the session display area into the primary display area; and
- means for moving the control bar to float over the primary display area in response to moving the session display area into the primary display area.

* * * * *